United States Patent [19]

Allen et al.

[11] Patent Number: 6,058,490
[45] Date of Patent: May 2, 2000

[54] METHOD AND APPARATUS FOR PROVIDING SCALEABLE LEVELS OF APPLICATION AVAILABILITY

[75] Inventors: Reginald L. Allen, Bolingbrook; Debra K. Haddad, Aurora; Susan A. Lee; John H. Pokropinski, both of Woodridge; Bonnie L. Prokopowicz, Oak Park; Dale F. Rathunde, Geneva; James P. Schoonover, Wheaton; Raymond D. Smith, Downers Grove, all of Ill.

[73] Assignee: Lucent Technologies, Inc., Murray Hill, N.J.

[21] Appl. No.: 09/063,560

[22] Filed: Apr. 21, 1998

[51] Int. Cl.[7] ....................................................... G06F 13/00
[52] U.S. Cl. ........................................................ 714/9; 714/8
[58] Field of Search ................................... 714/9, 7, 8, 5, 714/13

[56] References Cited

U.S. PATENT DOCUMENTS

| | | | |
|---|---|---|---|
| 5,588,111 | 12/1996 | Cutts, Jr. et al. | 395/182.07 |
| 5,633,857 | 5/1997 | Kim et al. | 370/242 |
| 5,790,775 | 8/1998 | Marks et al. | 395/182.07 |
| 5,935,258 | 8/1999 | Klein | 714/8 |
| 5,941,993 | 8/1999 | Tanaka et al. | 714/6 |
| 5,951,693 | 9/1999 | Walton et al. | 714/6 |
| 5,958,065 | 9/1999 | Klein | 714/5 |

*Primary Examiner*—Norman Michael Wright

[57] ABSTRACT

A method and an apparatus for providing scalable layers of highly available applications using loosely coupled commercially available computers. The software running on the loosely coupled computers is divided into three layers: the system layer, the platform layer, and the application layer, each having its own process group activation and fault recovery strategy. A process group contains software processes that depend upon a set of resources common to the process group. In addition to depending upon a common set of resources, processes within a process group share a fault recovery strategy. Fault recovery is performed at the process group level, such that if one process within a process group fails, fault recovery is takes place for all processes within the process group. In the preferred embodiment, an application layer process group may be paired with another application layer process group on a separate computer. As part of certain escalated process group fault recovery strategies, upon taking an application layer process group out of service, its paired application layer process group, if any exists, takes over performing the functions of the process group that was taken out of service.

88 Claims, 2 Drawing Sheets

METHOD AND APPARATUS FOR PROVIDING SCALEABLE LEVELS OF APPLICATION AVAILABILITY

BACKGROUND OF THE INVENTION

1. Field of the Invention

The present invention relates to computer system architectures, and more particularly to a reliable cluster computing architecture that provides scalable levels of high availability applications simultaneously across commercially available computing elements.

2. Statement of Related Art

Prior art high availability clustered computer systems are typically configured in an architecture having shared physical storage devices, such as a shared disk. Therefore, prior art cluster offerings are typically based on physical hardware, or clustered arrangements of systems and storage, particularly adapted to a unique application processing environment. In a common type of prior art high availability cluster, all of the critical application data must reside on an external shared disk, or on a pool of disks, that is accessible from at most one computing system in the cluster. Such a prior art cluster tries to isolate access to the data partitions on the disk so that access to the shared disk is limited to only one computing system at a time. Upon failure of the primary computing system, a takeover occurs whereby the high availability cluster reallocates access to the disk from the primary computing system to the dedicated backup system. Once such a reallocation is performed, the applications on that backup system will have access to the disk.

Another prior art high availability cluster solution is a multi-processor cluster. Like the shared-disk cluster, the multi-processor cluster is a hardware-based cluster arrangement of computing systems. Unlike the shared-disk cluster, in which the computing systems are essentially unrelated to each other, the computing systems in a multi-processor cluster are all running the same application and using the same data at virtually the same time. All physical storage is configured to be accessible to all computing systems. Such multi-processor clusters, in an attempt to control access to concurrent data, typically use lock management software to manage access to data and prevent any data corruption or integrity problems. The loss of a computing system from a multi-processor cluster allows the remaining systems to continue processing the data.

Another prior art high availability cluster solution is a symmetrical multi-processing, or scalable parallel processing, cluster based on a shared memory or system bus architecture where the memory is common to multiple computing systems. Such systems, in an attempt to improve performance by scaling the number of computing systems in the symmetrical multi-processing cluster, allow a single computing system failure to cause the entire symmetrical multi-processing or scalable parallel processing cluster platform to become unavailable.

Yet another high availability cluster architecture is a multiple parallel processor cluster, in which each computing system has its own memory and disk, none of which are shared with any other computing system in the cluster. If one system has data on a disk, and that data is required by another computing system, the first computer sends the data over a high speed network to the other computing system. Such multiple parallel processor clusters, in an attempt to improve performance by allowing multiple computing systems to work concurrently, allow data associated with a failed computing system to become unavailable.

The prior art high availability clusters, in trying to provide different levels of availability, have used operating system-based clusters to optimize the unique data and application characteristics for a specific targeted commercial market. Such a targeted approach does not lend itself well to certain industries, including telecommunications, in which numerous legacy applications currently exist, each with unique recovery and performance characteristics running on proprietary hardware, some of which is fault tolerant.

Therefore, a computing system architecture that provides varying levels of high availability applications simultaneously across one or more loosely coupled commercially available computing elements using a commercially available interconnect is desirable.

The prior art high availability cluster solutions have the capability to support "heartbeats" and recovery of a specified application. The most significant architectural difference between the prior art solutions is the method for determining how an application and/or computing system is chosen or controlled to be active or standby and the method for determining when they will be allowed access to the application data. Typical physical high availability cluster solutions determine the status of the configuration via a set of redundant communication facilities between the pair of computing systems. Under most circumstances, the paired systems are able to determine which system is active for an application.

In prior art high availability solutions, when all communication is lost between computing systems, the computing systems or clustered applications might each take on an active role believing that the other has failed. Such a situation presents an undesirably high risk of application data and processing being corrupted. Several added levels of protection and safety are possible to prevent that from happening. Some solutions in the prior art, nearly eliminate this risk using heartbeats through the shared storage. Since certain cluster solutions do not need to use shared storage, a platform neutral hardware component is desirable to complement the software-based cluster components. It is therefore an object of this invention to provide scaleable layers of highly available application processes using loosely coupled commercially available computing elements.

SUMMARY OF THE INVENTION

This invention provides a method and an apparatus for providing scaleable layers of high availability applications using loosely coupled commercially available computing elements, also referred to as computers. Computing elements refers to any type of processor or any device containing such a processor.

Resource dependencies and fault recovery strategies occur at the process group level. For example, a process group containing three processes might depend upon four resources, such as other process groups or peripheral devices, such as a disk. Upon failure of a single process within the process group or upon failure of a single resource depended upon by the process group, fault recovery will be initiated for the entire process group, as a single unit.

Process groups can belong to one of three layers: the system layer, the platform layer, or the application layer. In the preferred embodiment, each layer has a unique process group activation and fault recovery strategy. In the preferred embodiment, an application layer process group may be paired with another application layer process group on a separate computer. As part of certain escalated process group fault recovery strategies, upon taking an application layer process group out of service, its paired application layer process group, if any exists, takes over performing the functions of the process group that was taken out of service.

Application layer process groups depend upon one or more platform layer process groups, which depend upon one or more system layer process groups, which depend upon the hardware of the loosely coupled computer hosting the process groups.

Upon a system layer process group failure, all process groups on the host computer are taken out of service, which includes activating on another computer or computers any application layer process group that is paired with an application layer process group taken out of service, the computer hosting the failed system layer process group is re-booted, and all system layer, platform layer, and application layer process groups are re-initialized.

Upon a platform layer process group failure, the platform layer process group may be re-started zero or more times. If re-starting the failed platform layer process group does not cure the platform layer process group failure or if the platform layer process group is not restartable, all application layer and platform layer process groups on the host computer are taken out of service and re-initialized, which includes activating on another computer or computers any application layer process group that is paired with an application layer process group taken out of service on the host computer.

Upon failure of a resource depended upon by a platform layer process group, all application layer and platform layer process groups on the host computer are taken out of service and re-initialized, which includes activating on another computer or computers any application layer process group that is paired with an application layer process group taken out of service on the host computer.

Upon failure of an application layer process group, the failed application layer process group may be restarted zero or more times. If restarting the failed application layer process group does not correct the application layer process group failure or if the failed application layer process group is not restartable, then the failed application layer process group is taken out of service, which includes activating on another computer the application layer process group, if any, that is paired with the application layer process group taken out of service.

Upon failure of a resource depended upon by an application layer process group, the dependent application layer process group is taken out of service, which includes activating on another computer the application layer process group, if any, that is paired with the dependent application layer process group taken out of service on the host computer.

BRIEF DESCRIPTION OF THE DRAWINGS

FIG. 2 is a state diagram illustrating the sequence of states that a process group in the subject invention can transition through.

DETAILED DESCRIPTION OF THE PREFERRED EMBODIMENT

Figure 1:
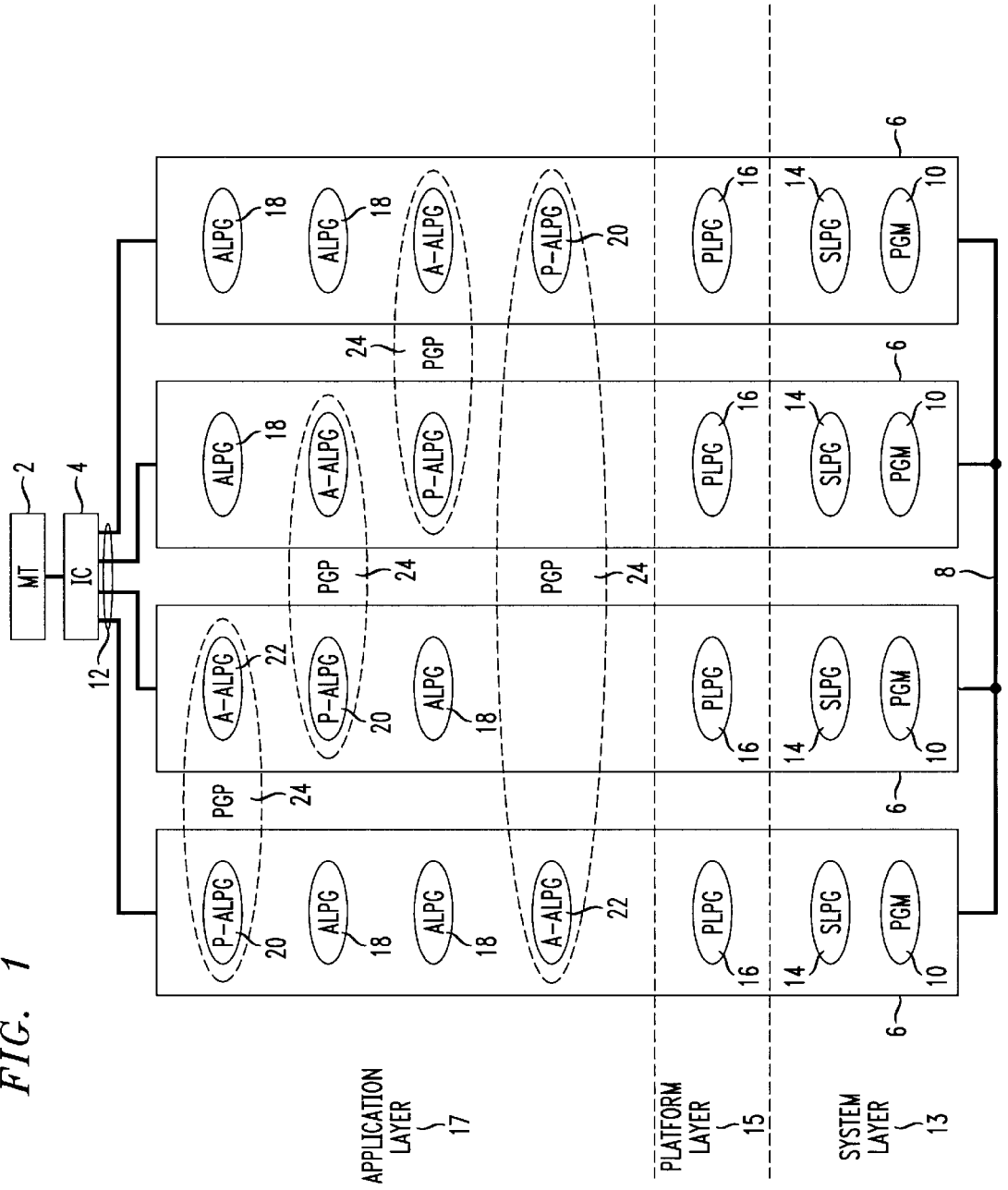
FIG. 1 is a block diagram illustration of the subject invention, including four loosely coupled computers, an independent computer, and a maintenance terminal.

FIG. 1 shows the preferred embodiment of the subject invention, including a maintenance terminal (MT) 2, an independent computer (IC) 4, four industry standard commercially available computing elements 6 (also referred to as computers 6) loosely coupled together through an interconnect 8, such as a network, a computer bus architecture, and the like. Computing elements 6, also referred to as computers 6, could be any type of processor or any device containing such a processor.

Each computer 6 is running process group management software 10, also referred to collectively as the process group manager. The process group manager 10 activates process groups and initiates fault recovery strategies at the process group level. A process group is a group of processes, which are typically implemented in software, that are related to each other in some way such that it is desirable to manage the process group as a single unit. It may be desirable to restart all of the processes within a process group together, or it may be desirable, as part of an escalated fault recovery strategy, to have the functionality of all of the processes in the process group performed by a process group on a separate computer. The process group might, but does not have to, depend upon a resource, or a set of resources common to the process group.

The independent computer 4 is preferably a computing device designed to have a minimal number of faults over an extended period of time. The independent computer 4 monitors computers 6 for hardware faults using heartbeats, as disclosed in commonly assigned U.S. Pat. No. 5,560,033. Each of the loosely coupled computers 6 is coupled to the centralized computer 4 as shown with reference numeral 12 in FIG. 1.

Process groups may belong to one of three layers: the system layer 13, the platform layer 15, and the application layer 17. Each computer 6 is shown running process group management (PGM) software 10, one system layer process group (SLPG) 14, one platform layer process group (PLPG) 16, either one or two application layer process groups (ALPG) 18 that are not of a process-group pair (PGP) 24, one primary application layer process group (P-ALPG) 20 that is part of a process-group pair 24, and one alternate application layer process group (A-ALPG) 22 that is part of a process-group pair 24. By definition: (1) each process-group pair 24 contains one primary process group 20 on a first computer 6 and one alternate process group 22 on a second computer 6; (2) each primary process group 20, and each alternate process group 22, is part of a process-group pair; and (3) process groups 14, 16, and 18 are not part of a process-group pair 24. In the preferred embodiment, process-group pairs may belong only to the application layer 17; however, process-group pairs could be provided at the system layer 13, the platform layer 15, or the system layer 13, or at all of these layers, without departing from the scope of this invention.

Although each computer 6 in the preferred embodiment is running the number of certain types of process groups mentioned above; without departing from the scope of this invention, each computer 6 could be running: (1) zero or more process groups 14, 16, and 18; (2) zero or more primary process groups 20; and (3) zero or more alternate process groups 22.

Similarly, the number of computers 6 can be two or more without departing from the scope of this invention, and, although the process group management software 10 is shown running on all four of the loosely coupled computers 6, it could be running on any permutation or combination of the loosely coupled computers 6 and/or the independent computer 4 without departing from the scope of this invention. Further, the functions performed by the independent computer 4 could be performed using any type of device capable of running any type of processor, such as a peripheral board with a digital signal processor, a system board with a general purpose processor, a fault tolerant processor and the like, without departing from the scope of this invention.

The independent computer 4 uses industry-standard interfaces 12, such as RS-232 in the preferred embodiment, although any interface could be used. This provides the capability of leveraging general networking interfaces, such as Ethernet, Fiber Distributed Data Interface (FDDI), Asynchronous Transfer Mode (ATM), and protocols, such as Transmission Control Protocol/Internet Protocol (TCP/IP), or Peripheral Component Interconnect (PCI).

Each loosely coupled computer 6 typically contains a uni-processor, multi-processor, or fault tolerant processor system having an operating environment that is the same as, or different from, the operating environment of each of the other loosely coupled computers 6. In other words, separate computers 6 can run different operating systems, for instance, WINDOWS as opposed to UNIX, different operating environments, for instance, real-time as opposed to non-real-time, and have different numbers and types of processors. Each of the loosely coupled computers 6 can be either located at the same site or geographically separated and connected via a network 8, such as a local area network (LAN) or a wide area network (WAN).

As previously mentioned, each process group 14, 16, 18, 20, or 22 contains one or more processes that may depend on a set of resources common to the process group 14, 16, 18, 20, or 22. For example, a set of such resources could include a computer hardware peripheral device, or another process group 14, 16, or 18, 20, or 22, a communication link, available disk space, or anything that might affect the availability of an external application. Each alternate process group 22 depends upon a set of resources that is functionally equivalent to the set of resources depended upon by the alternate-process-group's paired primary process group 20. The set of resources depended upon by a primary process group 20 and the separate set of resources depended upon by its paired alternate process group 22 do not, however, have to contain the same number of resources. Each of the processes contained within a process group 14, 16, 18, 20, or 22 also has an activation and fault recovery strategy common to the process group 14, 16, 18, 20, or 22.

Figure 2:
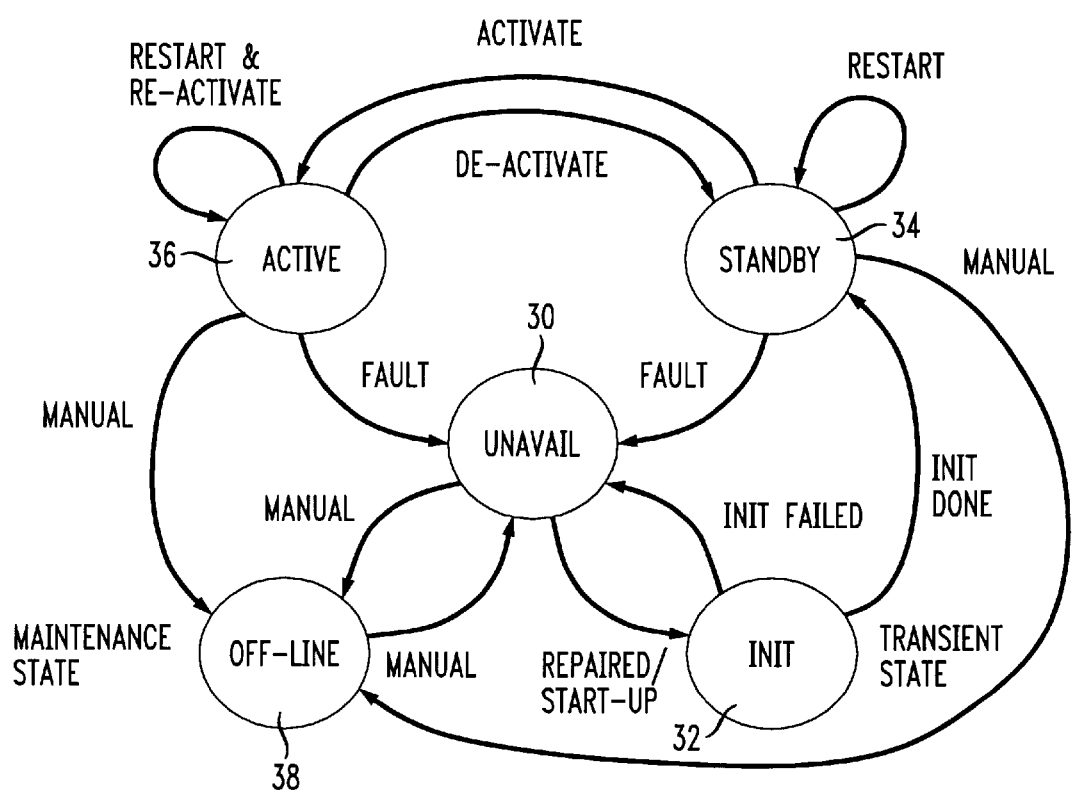

FIG. 2 shows the states through which every process group 14, 16, 18, 20, and 22 may transition, namely, Unavailable (Unavail) 30, Initialization (Init) 32, Standby 34, Active 36, and Off-line 38. Process groups in the Unavailable 30 and Initialization 32 states have not been started and, therefore, are not running. Process groups in the Active state 36 have been started and are running. Whether a process group in the Standby state 34 has been started and is running depends upon whether the process group is a hot-standby or a cold-standby process group. Hot-standby process groups in the Standby 34 state have been started and are waiting to be activated. Cold standby process groups in the Standby 34 state are not started until they are activated. Activation of cold standby process groups may also involve initializing any uninitialized resources depended upon by the Cold-standby process group. In a non-fault condition, primary process groups 20 are initialized to run in the Active state 36, and alternate process groups 22 are initialized to the Standby state 34.

In the preferred embodiment, the Off-line state 38 can only be entered and exited by manual operation. In other words, a human operator must enter a command from the local maintenance terminal 2 to put one or more process groups 14, 16, 18, 20, and 22 into the Off-line state 38 or to remove one or more process groups 14, 16, 18, 20, and 22 from the Off-line state 38. The Off-line state 38 may be entered under circumstances other than by manual operation, such as upon a command from the process group manager 10, without departing from the scope of this invention.

Assuming there are no resource or process group faults and neither the primary nor the alternate process groups 20 and 22 have been manually transitioned to the Off-line state 38, process-group pairs 24 contain a primary process group 20 and an alternate process group 22 in an Active 36/Standby 34 paired relationships: active/cold-standby or active/hot-standby. In the preferred embodiment, the primary process group 20 is initialized to the Active state 36 and the alternate process group 22 is initialized to the Standby state 34.

Although primary process groups 20 are initialized to Active 36 and alternate process groups 22 are initialized to Standby 34, under certain conditions, an alternate process group 22 can be Active 36 while its paired primary process group 20 is Standby 34. For example, if a fault occurs in a primary process group 20 contained in a process-group pair 24 having an Active 36/Standby 34 paired relationship, the process group manager 10 will transition that primary process group 20 from Active 36 to Unavailable 30 and transition the alternate process group 22 from Standby 34 to Active 36. Once the fault that caused the primary process group 20 to be transitioned to Unavailable 30 has been corrected, the primary process group 20 will be transitioned to Standby 34 until some event, such as an alternate process group fault occurs to cause the alternate process group 22 to transition to Unavailable 30, at which time the primary process group 20 will be transitioned from Standby 34 to Active 36. A process-group pair's primary and alternate process groups 20 and 22 can be switched from Active 36/Standby 34 to Standby 34/Active 36 manually or under circumstances in which switching the Active 36 process group 20 or 22 to Standby 34 and the Standby 34 process group 20 or 22 to Active 36 is desirable.

The availability of an application layer process group 18, 20 or 22 typically depends upon the availability of one or more platform layer process groups 16. The availability of a platform layer process groups 16 typically depends upon the availability of one or more system layer process groups 14, and the availability of system layer process groups 14 depends upon the availability of the hardware of the computer 6 hosting the system layer process groups 14. System layer process groups 14 are initialized before platform layer process groups 16, which are initialized before application layer process groups 18, 20, and 22.

This invention provides the flexibility to implement external applications using various numbers of process groups 14, 16, 18, 20, and 22, and/or process-group pairs 24 spread across two or more computers 6. For instance, the four process-group pairs 24 shown in FIG. 1 could be part of one external application, or they could be part of four, or three, or two, separate external applications. In addition, two of the process group pairs 24 shown in FIG. 1 could be part of the same external application, yet be hosted by two separate pairs of computers 6. Further, one or more process-group pairs 24 and/or one or more process groups 14, 16, 18, 20, or 22 may depend upon the same resource as one or more other process-group pairs 24 and/or one or more process groups 14, 16, 18, 20, or 22, such that the failure of a single resource could cause a plurality of process groups' and/or a plurality of process-group pairs' fault recovery strategies to be performed.

Each layer, system 13, platform 15, and application 17, has unique process group activation and fault recovery strategy. In the preferred embodiment, the system layer contains non-restartable non-relocatable process groups 14. The platform layer may contain either, or both, of two types of process groups. Platform layer process groups 16 may be either: (1) non-restartable and non-relocatable; or (2) restartable and non-relocatable. The application layer 17 may contain any, or all, of the following three types of process groups: (1) non-restartable and non-relocatable process groups 18; (2) restartable and non-relocatable process groups 18; and (3) restartable and relocatable process groups 20 and 22. Relocatable refers to relocating performance of the functionality of a primary process group 20 or an alternate process group 22 from one computer 6 to another computer 6, rather than any type of re-location within the same computer 6. Primary process groups 20 and alternate process groups 22 are relocatable. Process groups 14, 16, and 18 are not relocatable. As previously mentioned, in the preferred embodiment, a primary process group 20 and a secondary process group 22 can belong to only the application layer 17. Nevertheless, it will be obvious to those having ordinary skill in the art that primary and alternate process groups 20 and 22 could belong to the platform and/or system layers and that other permutations and combinations of layer-based fault recovery and process group activation strategies and restartability and relocatability can be implemented without departing from the scope of this invention.

Upon a system layer process group failure: (1) all system layer, platform layer, and application layer process groups 14, 16, 18, 20, and 22 on the computer 6 hosting the failed system layer process group ("host computer") are taken out of service by transitioning them to the Unavailable state 30; (2) for each primary and alternate process group 20 and 22 that is transitioned from Active 36 to Unavailable 30 on the host computer, its paired process group 20 or 22 is activated on a separate computer 6 by transitioning the paired process group 20 or 22 from Standby 34 to Active 36; and (3) the computer 6 that is hosting the failed system layer process group 14 is rebooted. In the preferred embodiment, re-booting can be done a pre-determined number of times over a pre-determined time period. If re-booting host computer 6 does not clear the fault, the independent computer 4 will then power cycle the host computer 6, thereby re-booting the host computer 6. In the preferred embodiment, power cycling can be done a pre-determined number of times over a pre-determined time period. If power cycling the host computer does not does not clear the system layer process group failure, the independent computer 4 will cut off power to the host computer 6, which will remain in a powered down state.

Upon a platform layer process failure, the failed process may be re-started zero or more times. In the preferred embodiment, re-startable platform layer processes may be re-started a pre-determined number of times over a pre-determined time period, for instance three re-starts within five minutes.

Upon failure of re-starting the failed platform layer process to cure the failure, the process group 16 containing the failed process may be re-started zero or more times. In the preferred embodiment, re-startable platform layer process groups 16 may be re-started a pre-determined number of times over a pre-determined time period. When such a process group 16 is restarted, it is restarted in its previous running state.

If re-starting the failed platform layer process group 16 does not correct the platform layer process failure, fault recovery is escalated to: (1) taking all application layer process groups out of service, including activating any process groups 20 or 22 on separate computers that are running Standby 34 and that are paired with an application layer process group 20 or 22 taken out of service, if any such paired Standby process groups 20 or 22 exist; and (2) re-initializing all platform layer process groups 16 on the computer hosting the failed platform layer process. If the failed platform layer process and the process group in which it is contained are both non-restartable, then this escalated fault recovery strategy is the initial fault recovery action taken. This escalated platform layer process group fault recovery procedure is also implemented upon detection of a fault in a resource depended upon by a platform layer process group 16, with the added step of re-initializing the resource for which a fault was detected. If re-initializing all platform layer process groups 16 on the computer 6 hosting the failed platform layer process or resource ("hosting computer") does not cure the failure, hosting computer 6 is re-booted, thereby causing all process groups 14, 16, 18, 20, and 22 on hosting computer 6 to be re-started. In the preferred embodiment, hosting computer 6 can be re-booted a pre-determined number of times over a pre-determined time period. If re-booting hosting computer 6 does not cure the failure, independent computer 4 will then power cycle hosting computer 6, thereby re-booting hosting computer 6. In the preferred embodiment, hosting computer 6 can be power cycled a pre-determined number of times over a pre-determined time period. If power cycling hosting computer 6 does not does not clear the platform layer process group failure, independent computer 4 will cut off power to hosting computer 6, which will remain in a powered down state.

Upon failure of a process in an application layer process group 18, 20, or 22, the failed process may be re-started zero or more times. In the preferred embodiment, re-startable application layer processes may be re-started a pre-determined number of times over a predetermined time period.

Upon failure of re-starting the failed application layer process to cure the failure, the process group 18, 20 or 22 containing the failed process may be re-started zero or more times. In the preferred embodiment, re-startable application layer process groups 18, 20, and 22 may be re-started a pre-determined number of times over a pre-determined time period. When such a process group 18, 20 or 22 is restarted, it is restarted in its previous running state.

If the failed application layer process group 18, 20, or 22, is an application layer process group 18, or a primary or alternate process group 20 or 22 running Active 36 and re-starting such a failed process group does not correct the application layer process failure, fault recovery is escalated to: taking such a failed application layer process group out of service by transitioning it to the Unavailable state 30, and, for such a primary or alternate process groups 20 or 22, activating its paired standby process group 20 or 22 on a separate computer 6. This escalated fault recovery strategy is the initial fault recovery strategy for process faults of non-restartable processes contained within non-restartable application layer process groups 18, 20 and 22. This escalated fault recovery strategy is also used upon detection of a fault in a resource depended upon by an application layer process group 18, 20, or 22 running in the Active state 36, with the added step of re-initializing the resource for which a fault was detected.

If an application layer process group 18, 20, or 22 cannot be taken out of service and transitioned to Unavailable 30, fault recovery escalates to re-initializing and re-starting all application layer and platform layer process groups 16, 18, 20, and 22 on the computer 6 hosting the failed application layer process group or resource ("computer hosting the application layer failure"). In the preferred embodiment, such re-initializations and re-starts can be performed a pre-determined number of times over a pre-determined period on the computer hosting the application layer failure 6. If re-initializing and re-starting all platform layer and application layer process groups 16, 18, 20, and 22 on the computer hosting the application layer failure does not cure the failure, the computer hosting the application layer failure is re-booted, thereby causing all process groups 14, 16, 18, 20, and 22 on the computer hosting the application layer failure to be re-started. In the preferred embodiment, the computer hosting the application layer failure can be re-booted a pre-determined number of times over a pre-determined time period. If re-booting the computer hosting the application layer failure does not cure the failure, independent computer 4 will then power cycle the computer hosting the application layer failure, thereby re-booting the computer hosting the application layer failure. In the preferred embodiment, the computer hosting the application layer failure can be power-cycled a pre-determined number of times over a pre-determined time period. If power cycling the computer hosting the application layer failure does not clear the failure, independent computer 4 will cut off power to the computer hosting the application layer failure, which will remain in a powered down state.

Application layer process groups 18, 20, and 22 may, or may not, depend upon application layer process groups 18. Therefore, a fault in an application layer process group 18, 20 or 22 will not affect the availability of any system layer process groups 14 or any platform layer process groups 16. A fault in an application layer process group 18, 20 or 22 will also not affect the availability of any application layer process groups 18, 20 and 22 that are not dependent upon the failed application layer process group 18, 20, or 22. However, any application layer process groups 18, 20, and 22 that are dependent upon an application layer process group 18 that is taken out of service, will also be taken out service.

If a failed primary or alternate process group 20 or 22 is running Standby 34 and re-starting such a failed process group does not correct the failure, fault recovery is escalated to: taking such a failed Standby 34 primary or alternate process group 20 or 22 out of service by transitioning it to the Unavailable state 30. Upon inability to take such a failed Standby 34 primary or alternate process group 20 or 22 out of service, the previously described escalated fault recovery strategy that is implemented upon inability to take any application layer process group 18, 20, or 22 out of service is implemented.

Upon detection of a fault in a resource depended upon by an application layer process group 20, or 22 running in the Standby state 34 or upon detection of a process failure in a non-restartable process group 20 or 22 running in the Standby state 34, the application layer process group 20 or 22 that is dependent upon the failed resource, or the process group 20 or 22 for which the failure was detected, is transitioned to the Unavailable state 30. Upon inability to take such a process group 20 or 22 out of service, the previously described escalated fault recovery strategy that is implemented upon inability to take any application layer process group 18, 20, or 22 out of service is implemented.

The process group manager 16 can make the state of individual process groups 14, 16, 18, 20, and 22 and critical resources known to either: (1) only those computer systems 6 hosting the process groups 14, 16, 18, 20, and 22 to which the state information pertains, or (2) all of the loosely coupled computing systems 6. In addition, such state information can be made available to external application software.

In the preferred embodiment, transitions between process group states are controlled by process group management software 10 running on each of the loosely coupled computers 6. Nevertheless, such transitions could be controlled by process group management software 10 running on any permutation and/or combination of the centralized computer 4 and the loosely coupled computers 6 without departing from the scope of this invention.

System layer process groups 14 can contain either: (1) operating system software and services found in normal commercially available computing systems; or (2) process group management software 10.

Resources depended upon by platform layer process groups 16 are initialized before initializing platform layer process groups 16. Failure to bring a platform layer resource in service results in the host computer 6 being re-booted results in the same fault recovery strategy as previously explained for a fault in a resource depended upon by a platform layer process group 16.

During initialization, platform layer process groups 16 and application layer process groups 18, 20, and 22 are designated runable only when all platform layer resources and platform layer process groups 16 are designated runable.

Platform layer process groups 16 handshake with the process group manager 10 to control the startup sequence of platform layer process groups 16. Similarly, application layer process groups 18, 20, and 22 handshake with the process group manager 10 to control the startup sequence of application layer process groups 18, 20, and 22.

Application layer process groups 18, 20, and 22 can be put into the Off-line state 38 individually so that maintenance or software updates can be performed on the Off-line process groups 18, 20, and 22 without impacting other process groups on the computer 6 hosting the Off-line process groups 18, 20, and 22.

Primary and alternate process groups 20 and 22 within the same process-group pair 24 may have a shared resource dependency. Process-group pairs 24 that have an active cold-standby paired relationship typically provide high availability. Process-group pairs 24 that have an active hot-standby paired relationship typically provide very high availability.

It will be obvious to those having ordinary skill in the art that primary and alternate process groups could be arranged in a lead-active/active paired relationship, analogous to the Active 36/Standby 34 relationship described above, without departing from the scope of this invention. Such lead-active/active process-group pairs typically provide ultra-high availability.

Application layer resources on a single computing system are initialized before initializing primary or alternate process groups 20 or 22. Failure to bring a critical application layer resource in service results in taking the dependent application layer process group 18, 20, or 22 out of service by transitioning it to the Unavailable state 30, and activating the dependent process group's 20, or 22 paired process group 20 or 22, if one exists, on a separate computer 6.

Activated platform layer and application layer process groups 16, 18, 20, and 22 handshake with the process group manager 10 to acknowledge activation to Active 36 or Standby 34.

Process-group pairs 24 can be provided only when platform layer process groups 16 are operating normally on the computers 6 hosting both the primary process group 20 and the alternate process group 22 that are be contained in the process-group pair 24.

Upon a primary or alternate process group's 20 or 22 failure to acknowledge initiation of activation by the process group manager 10, the primary or alternate process group 20 or 22 for which activation was initiated is transitioned to the Unavailable state 30. Similarly, upon an application layer primary or alternate process group's 20 or 22 failure to acknowledge initiation of de-activation from Active 36 to Standby 34, the primary or alternate process group 20 or 22 for which de-activation was initiated is transitioned to the Unavailable state 30.

Although initiated, activation of a standby process group 20 or 22 does not occur until the Standby process group 20 or 22 for which activation has been initiated acknowledges initiation of the activation by handshaking with the process group manager 10.

Primary and alternate process groups 20 and 22 belonging to the same process-group pair 24 can be put in the Off-line state 38 for maintenance without impacting other process groups 18, 20, and 22, on any of the loosely coupled computers 6.

Separate application layer process groups 18, 20, and 22, running on the same computer 6, or on different computers 6, can host dissimilar external applications, such as one or more application layer process groups 18, 20, or 22 controlling Code Division Multiple Access (CDMA) cellular telephone call processing, one or more process groups 18, 20, or 22 controlling Time Division Multiple Access (TDMA) cellular telephone call processing, one or more process groups 18, 20, or 22 controlling Group Special Mobile (GSM) cellular telephone call processing, one or more process groups 18, 20, or 22 controlling Cellular Digital Packet Data (CDPD) cellular telephone call processing, and one or more process groups 18, 20, or 22 controlling Analog Mobile Phone Service (AMPS) cellular telephone call processing. Similarly, separate application layer process groups 18, 20, and 22, running on the same computer 6, or on different computers 6, can host dissimilar external applications.

As will be obvious to those having ordinary skill in the art, this invention provides the flexibility to configure one or more process-group pairs 24 across two or more loosely coupled computers 6 in several high availability computing element 6 configurations including active/standby, active/active, and a typical n+k sparing arrangement.

We claim:

1. A method for providing high availability applications comprising, in combination, the steps of:
    a. running, on at least two computers, one or more process groups, at least one of said process groups containing one or more processes that have a fault recovery strategy common to said at least one of said process groups;
    b. running, on at least one of said at least two computers, a process group manager that initiates a fault recovery strategy for at least one of said one or more process groups;
    c. providing, on at least a first of said at least two computers, a system layer having at least one process group;
    d. taking all of said process groups out of service on said first computer upon a system layer process group fault occurring on said first computer;
    e. re-booting said first computer upon a system layer process group fault occurring on said first computer;
    f. providing at least one paired process group on a second of said at least two computers, said paired process group being paired with one of said one or more process groups on said first computer; and
    g. activating said paired process group on said second computer upon a system layer process group fault occurring on said first computer.

2. The method of claim 1 further comprising, in combination, the step of: using an independent computer to power cycle said first computer upon failure of said re-booting of said first computer to cure said system layer process group fault.

3. The method of claim 2 further comprising, in combination, the step of: using an independent computer to power down said first computer upon failure of said power cycling of said first computer to cure said system layer process group fault.

4. A method for providing high availability applications comprising, in combination, the steps of:
    a. running, on at least two computers, one or more process groups, at least one of said process groups containing one or more processes that have a fault recovery strategy common to said at least one of said process groups;
    b. running, on at least one of said at least two computers, a process group manager that initiates a fault recovery strategy for at least one of said one or more process groups;
    c. providing, on at least a first of said at least two computers, a system layer having at least one process group;
    d. taking all of said process groups out of service on said first computer upon a fault in a resource depended upon by at least one of said system layer process groups on said first computer;
    e. re-booting said first computer upon said fault in said resource depended upon by at least one of said system layer process groups on said first computer;
    f. providing at least one paired process group on a second of said at least two computers, said paired process group being paired with one of said process groups on said first computer; and
    g. activating said paired process group on said second computer upon said fault in said resource depended upon by at least one of said system layer process groups on said first computer.

5. The method of claim 4 further comprising, in combination, the step of: using an independent computer to power cycle said first computer upon failure of said re-booting of said first computer to cure said fault in said resource depended upon by at least one of said system layer process groups on said first computer.

6. The method of claim 5 further comprising, in combination, the step of: using an independent computer to power down said first computer upon failure of said power cycling of said first computer to cure said fault in said resource depended upon by at least one of said system layer process groups on said first computer.

7. A method for providing high availability applications comprising, in combination, the steps of:
    a. running, on at least two computers, one or more process groups, at least one of said process groups containing one or more processes that have a fault recovery strategy common to said at least one of said process groups;

b. running, on at least one of said at least two computers, a process group manager that initiates a fault recovery strategy for at least one of said one or more process groups;

c. providing, on at least a first of said at least two computers, a system layer having at least one process group;

d. taking all of said process groups out of service on said first computer upon a system layer process group fault occurring on said first computer;

e. re-booting said first computer upon a system layer process group fault occurring on said first computer;

f. providing, on at least said first computer, a platform layer having at least one process group;

g. taking all of said process groups, except each of said at least one process group in said system layer, out of service on said first computer upon a platform layer process group fault occurring on said first computer;

h. providing at least one paired process group on a second of said at least two computers, said paired process group being paired with one of said process groups on said first computer; and i. activating said paired process group on said second computer upon said platform layer process group fault occurring on said first computer.

8. The method of claim 7 further comprising, in combination, the step of: re-initializing all of said process groups, except each of said at least one process group in said system layer, on said first computer upon said platform layer process group fault occurring on said first computer.

9. The method of claim 8 further comprising, in combination, the step of: re-booting said first computer upon failure of said re-initialization to cure said platform layer process group fault.

10. The method of claim 9 further comprising, in combination, the step of: using an independent computer to power cycle said first computer upon failure of said re-booting of said first computer to cure said platform layer process group fault.

11. The method of claim 10 further comprising, in combination, the step of: using an independent computer to power down said first computer upon failure of said power cycling of said first computer to cure said platform layer process group fault.

12. A method for providing high availability applications comprising, in combination, the steps of:

a. running, on at least two computers, one or more process groups, at least one of said process groups containing one or more processes that have a fault recovery strategy common to said at least one of said process groups;

b. running, on at least one of said at least two computers, a process group manager that initiates a fault recovery strategy for at least one of said one or more process groups;

c. providing, on at least a first of said at least two computers, a system layer having at least one process group;

d. taking all of said process groups out of service on said first computer upon a system layer process group fault occurring on said first computer;

e. re-booting said first computer upon a system layer process group fault occurring on said first computer;

f. providing, on at least a first of said at least two computers, a platform layer having at least one process group;

g. taking all of said process groups, except each of said at least one process group in said system layer, out of service on said first computer upon a fault in a resource depended upon by at least one of said platform layer process groups on said first computer;

h. providing at least one paired process group on a second of said at least two computers, said at least one paired process group being paired with one of said process groups on said first computer; and i. activating said at least one paired process group on said second computer upon said fault in said resource depended upon by at least one of said platform layer process groups on said first computer.

13. The method of claim 12 further comprising, in combination, the steps of:

a. re-initializing said resource having said fault; and b. re-initializing all of said process groups, except each of said at least one process group in said system layer, on said first computer upon said fault in said resource depended upon by at least one of said platform layer process groups on said first computer.

14. The method of claim 13 further comprising, in combination, the step of: re-booting said first computer upon failure of said re-initializations to cure said fault in said resource depended upon by at least one of said platform layer process groups on said first computer.

15. The method of claim 14 further comprising, in combination, the step of: using an independent computer to power cycle said first computer upon failure of said re-booting of said first computer to cure said fault in said resource depended upon by at least one of said platform layer process groups on said first computer.

16. The method of claim 15 further comprising, in combination, the step of: using an independent computer to power down said first computer upon failure of said power cycling of said first computer to cure said fault in said resource depended upon by at least one of said platform layer process groups on said first computer.

17. A method for providing high availability applications comprising, in combination, the steps of:

a. running, on at least two computers, one or more process groups, at least one of said process groups containing one or more processes that have a fault recovery strategy common to said at least one of said process groups;

b. running, on at least one of said at least two computers, a process group manager that initiates a fault recovery strategy for at least one of said one or more process groups;

c. providing, on at least a first of said at least two computers, a system layer having at least one process group;

d. taking all of said process groups out of service on said first computer upon a system layer process group fault occurring on said first computer;

e. re-booting said first computer upon a system layer process group fault occurring on said first computer;

f. providing, on at least a first of said at least two computers, a platform layer having at least one process group;

g. restarting at least one of said platform layer process groups upon a platform layer process group fault occurring on said first computer;

h. taking all of said process groups, except each of said at least one process group in said system layer, out of service on said first computer upon failure of said re-start to cure said platform layer process group fault;

i. providing at least one paired process group on a second of said at least two computers, said at least one paired process group being paired with one of said process groups on said first computer; and j. activating said at least one paired process group on said second computer upon failure of said re-start to cure said platform layer process group fault.

18. The method of claim 17 further comprising, in combination, the step of: re-initializing all of said process groups, except each of said at least one process group in said system layer, on said first computer upon failure of said re-start to cure said platform layer process group fault.

19. The method of claim 18 further comprising, in combination, the step of: re-booting said first computer upon failure of said re-initialization to cure said platform layer process group fault.

20. The method of claim 19 further comprising, in combination, the step of: using an independent computer to power cycle said first computer upon failure of said re-booting of said first computer to cure said platform layer process group fault.

21. The method of claim 20 further comprising, in combination, the step of: using an independent computer to power down said first computer upon failure of said power cycling of said first computer to cure said platform layer process group fault.

22. A method for providing high availability applications comprising, in combination, the steps of:

a. running, on at least two computers, one or more process groups, at least one of said process groups containing one or more processes that have a fault recovery strategy common to said at least one of said process groups;

b. running, on at least one of said at least two computers, a process group manager that initiates a fault recovery strategy for at least one of said one or more process groups;

c. providing, on at least said first computer, a system layer having at least one process group;

d. taking all of said process groups out of service on said first computer upon a system layer process group fault occurring on said first computer;

e. re-booting said first computer upon a system layer process group fault occurring on said first computer;

f. providing, on at least a first of said at least two computers, an application layer having at least one process group;

g. taking said at least one application layer process group out of service on said first computer upon a fault in said at least one application layer process group on said first computer;

h. providing at least one paired process group on a second of said at least two computers, said paired process group being paired with one of said at least one application layer process group taken out of service on said first computer;

i. activating said paired process group on said second computer upon said fault in said at least one application layer process group on said first computer; and j. re-initializing all of said process groups, except each of said at least one process group in said system layer, on said first computer upon not being able to take said application layer process group having said fault out of service on said first computer.

23. The method of claim 22 further comprising, in combination, the step of: re-booting said first computer upon failure of said re-initialization to cure said application layer process group fault.

24. The method of claim 23 further comprising, in combination, the step of: using an independent computer to power cycle said first computer upon failure of said re-boot of said first computer to cure said application layer process group fault.

25. The method of claim 24 further comprising, in combination, the step of: using an independent computer to power down said first computer upon failure of said power cycling of said first computer to cure said application layer process group fault.

26. A method for providing high availability applications comprising, in combination, the steps of:

a. running, on at least two computers, one or more process groups, at least one of said process groups containing one or more processes that have a fault recovery strategy common to said at least one of said process groups;

b. running, on at least one of said at least two computers, a process group manager that initiates a fault recovery strategy for at least one of said one or more process groups;

c. providing, on at least a first of said at least two computers, an application layer having at least two process groups;

d. defining a dependency by at least a first of said at least two application layer process groups upon at least a second of said at least two application layer process groups;

e. taking said first and said second application layer process groups out of service on said first computer upon a fault in said second application layer process group on said first computer;

f. providing at least one paired process group on a second of said at least two computers, said paired process group being paired with said second application layer process group on said first computer; and g. activating said paired process group on said second computer upon said fault in said second application layer process group on said first computer.

27. The method of claim 26 further comprising, in combination, the steps of:

a. providing, on at least said first computer, a system layer having at least one process group;

b. taking all of said process groups out of service on said first computer upon a system layer process group fault occurring on said first computer;

c. re-booting said first computer upon a system layer process group fault occurring on said first computer; and d. re-initializing all of said process groups, except each of said at least one process group in said system layer, on said first computer upon not being able to take said first application layer process group out of service on said first computer.

28. The method of claim 27 further comprising, in combination, the step of: re-booting said first computer upon failure of said re-initialization to cure said fault in said second application layer process group.

29. The method of claim 28 further comprising, in combination, the step of: using an independent computer to power cycle said first computer upon failure of said re-boot of said first computer to cure said fault in said second application layer process group.

30. A method for providing high availability applications comprising, in combination, the steps of:
   a. running, on at least two computers, one or more process groups, at least one of said process groups containing one or more processes that have a fault recovery strategy common to said at least one of said process groups;
   b. running, on at least one of said at least two computers, a process group manager that initiates a fault recovery strategy for at least one of said one or more process groups;
   c. providing, on at least a first of said at least two computers, an application layer having at least one process group;
   d. taking said at least one application layer process group out of service on said first computer upon a fault in a resource depended upon by said at least one application layer process group;
   e. providing at least one paired process group on a second of said at least two computers, said paired process group being paired with one of said at least one application layer process group on said first computer; and
   f. activating said paired process group on said second computer upon said fault in said resource depended upon by said at least one application layer process group.

31. The method of claim 30 further comprising, in combination, the steps of:
   a. providing, on at least said first computer, a system layer having at least one process group;
   b. taking all of said process groups out of service on said first computer upon a system layer process group fault occurring on said first computer;
   c. re-booting said first computer upon a system layer process group fault occurring on said first computer;
   d. re-initializing said resource having said fault; and
   e. re-initializing all of said process groups, except each of said at least one process group in said system layer, on said first computer upon not being able to take said at least one application layer process group out of service on said first computer.

32. The method of claim 31 further comprising, in combination, the step of: re-booting said first computer upon failure of said re-initializations to cure said fault in said resource depended upon by said at least one application layer process group.

33. The method of claim 32 further comprising, in combination, the step of: using an independent computer to power cycle said first computer upon failure of said re-boot of said first computer to cure said fault in said resource depended upon by said at least one application layer process group.

34. The method of claim 33 further comprising, in combination, the step of: using an independent computer to power down said first computer upon failure of said power cycling of said first computer to cure said fault in said resource depended upon by said at least one application layer process group.

35. A method for providing high availability applications comprising, in combination, the steps of:
   a. running, on at least two computers, one or more process groups, at least one of said process groups containing one or more processes that have a fault recovery strategy common to said at least one of said process groups;
   b. running, on at least one of said at least two computers, a process group manager that initiates a fault recovery strategy for at least one of said one or more process groups;
   c. providing, on at least said first computer, a system layer having at least one process group;
   d. taking all of said process groups out of service on said first computer upon a system layer process group fault occurring on said first computer;
   e. re-booting said first computer upon a system layer process group fault occurring on said first computer;
   f. providing, on at least a first of said at least two computers, an application layer having at least one process group;
   g. re-starting said at least one application layer process group on said first computer upon a fault in said at least one application layer process group;
   h. taking said at least one application layer process group out of service on said first computer upon failure of said re-start to cure said fault in said at least one application layer process group;
   i. providing at least one paired process group on a second of said at least two computers, said paired process group being paired with one of said at least one application layer process group taken out of service on said first computer;
   j. activating said paired process group on said second computer upon failure of said re-start to cure said fault in said at least one application layer process group taken out of service on said first computer; and
   k. re-initializing all of said process groups, except each of said at least one process group in said system layer, on said first computer upon not being able to take said application layer process group having said fault out of service on said first computer.

36. The method of claim 35 further comprising, in combination, the step of: re-booting said first computer upon failure of said re-initialization to cure said application layer process group fault.

37. The method of claim 36 further comprising, in combination, the step of: using an independent computer to power cycle said first computer upon failure of said re-boot of said first computer to cure said application layer process group fault.

38. The method of claim 37 further comprising, in combination, the step of: using an independent computer to power down said first computer upon failure of said power cycling of said first computer to cure said application layer process group fault.

39. The method of claim 38 further comprising, in combination, the step of: using an independent computer to power down said first computer upon failure of said power cycling of said first computer to cure said fault in said second application layer process group.

40. A method for providing high availability applications comprising, in combination, the steps of:
   a. running, on at least two computers, one or more process groups, at least one of said process groups containing one or more processes that have a fault recovery strategy common to said at least one of said process groups;
   b. running, on at least one of said at least two computers, a process group manager that initiates a fault recovery strategy for at least one of said one or more process groups;

c. providing, on at least a first of said at least two computers, an application layer having at least two process groups;

d. defining a dependency by at least a first of said at least two application layer process groups upon at least a second of said at least two application layer process groups;

e. re-starting said second application layer process group on said first computer upon a fault in said second application layer process group;

f. taking said first and said second application layer process groups out of service on said first computer upon failure of said re-start to cure said fault in said second application layer process group;

g. providing at least one paired process group on a second of said at least two computers, said paired process group being paired with said first application layer process group on said first computer; and h. activating said at least one paired process group on said second computer upon failure of said re-start to cure said fault in said second application layer process group.

41. The method of claim 40 further comprising, in combination, the steps of:

a. providing, on at least said first computer, a system layer having at least one process group;

b. taking all of said process groups out of service on said first computer upon a system layer process group fault occurring on said first computer;

c. re-booting said first computer upon a system layer process group fault occurring on said first computer; and d. re-initializing all of said process groups, except each of said at least one process group in said system layer, on said first computer upon not being able to take said first application layer process group out of service on said first computer.

42. The method of claim 41 further comprising, in combination, the step of: re-booting said first computer upon failure of said re-initialization to cure said fault in said second application layer process group.

43. The method of claim 42 further comprising, in combination, the step of: using an independent computer to power cycle said first computer upon failure of said re-boot of said first computer to cure said fault in said second application layer process group.

44. The method of claim 43 further comprising, in combination, the step of: using an independent computer to power down said first computer upon failure of said power cycling of said first computer to cure said fault in said second application layer process group.

45. An apparatus for providing high availability applications comprising, in combination:

a. means for running, on at least two computers, one or more process groups, at least one of said process groups containing one or more processes that have a fault recovery strategy common to said at least one of said process groups;

b. means for running, on at least one of said at least two computers, a process group manager that initiates a fault recovery strategy for at least one of said one or more process groups;

c. means for providing, on at least a first of said at least two computers, a system layer having at least one process group;

d. means for taking all of said process groups out of service on said first computer upon a system layer process group fault occurring on said first computer;

e. means for re-booting said first computer upon a system layer process group fault occurring on said first computer;

f. means for providing at least one paired process group on a second of said at least two computers, said paired process group being paired with one of said one or more process groups on said first computer; and g. means for activating said paired process group on said second computer upon a system layer process group fault occurring on said first computer.

46. The apparatus of claim 45 further comprising, in combination: means for using an independent computer to power cycle said first computer upon failure of said re-booting of said first computer to cure said system layer process group fault.

47. The apparatus of claim 46 further comprising, in combination: means for using an independent computer to power down said first computer upon failure of said power cycling of said first computer to cure said system layer process group fault.

48. An apparatus for providing high availability applications comprising, in combination:

a. means for running, on at least two computers, one or more process groups, at least one of said process groups containing one or more processes that have a fault recovery strategy common to said at least one of said process groups;

b. means for running, on at least one of said at least two computers, a process group manager that initiates a fault recovery strategy for at least one of said one or more process groups;

c. means for providing, on at least a first of said at least two computers, a system layer having at least one process group;

d. means for taking all of said process groups out of service on said first computer upon a fault in a resource depended upon by at least one of said system layer process groups on said first computer;

e. means for re-booting said first computer upon said fault in said resource depended upon by at least one of said system layer process groups on said first computer;

f. means for providing at least one paired process group on a second of said at least two computers, said paired process group being paired with one of said process groups on said first computer; and g. means for activating said paired process group on said second computer upon said fault in said resource depended upon by at least one of said system layer process groups on said first computer.

49. The apparatus of claim 48 further comprising, in combination: means for using an independent computer to power cycle said first computer upon failure of said re-booting of said first computer to cure said fault in said resource depended upon by at least one of said system layer process groups on said first computer.

50. The apparatus of claim 49 further comprising, in combination: means for using an independent computer to power down said first computer upon failure of said power cycling of said first computer to cure said fault in said resource depended upon by at least one of said system layer process groups on said first computer.

51. An apparatus for providing high availability applications comprising, in combination:

a. means for running, on at least two computers, one or more process groups, at least one of said process groups containing one or more processes that have a fault recovery strategy common to said at least one of said process groups;

b. means for running, on at least one of said at least two computers, a process group manager that initiates a fault recovery strategy for at least one of said one or more process groups;

c. means for providing, on at least a first of said at least two computers, a system layer having at least one process group;

d. means for taking all of said process groups out of service on said first computer upon a system layer process group fault occurring on said first computer;

e. means for re-booting said first computer upon a system layer process group fault occurring on said first computer;

f. means for providing, on at least said first computer, a platform layer having at least one process group;

g. means for taking all of said process groups, except each of said at least one process group in said system layer, out of service on said first computer upon a platform layer process group fault occurring on said first computer;

h. means for providing at least one paired process group on a second of said at least two computers, said paired process group being paired with one of said process groups on said first computer; and i. means for activating said paired process group on said second computer upon said platform layer process group fault occurring on said first computer.

52. The apparatus of claim 51 further comprising, in combination: means for re-initializing all of said process groups, except each of said at least one process group in said system layer, on said first computer upon said platform layer process group fault occurring on said first computer.

53. The apparatus of claim 52 further comprising, in combination: means for re-booting said first computer upon failure of said re-initialization to cure said platform layer process group fault.

54. The apparatus of claim 53 further comprising, in combination: means for using an independent computer to power cycle said first computer upon failure of said re-booting of said first computer to cure said platform layer process group fault.

55. The apparatus of claim 54 further comprising, in combination: means for using an independent computer to power down said first computer upon failure of said power cycling of said first computer to cure said platform layer process group fault.

56. An apparatus for providing high availability applications comprising, in combination:

a. means for running, on at least two computers, one or more process groups, at least one of said process groups containing one or more processes that have a fault recovery strategy common to said at least one of said process groups;

b. means for running, on at least one of said at least two computers, a process group manager that initiates a fault recovery strategy for at least one of said one or more process groups;

c. means for providing, on at least a first of said at least two computers, a system layer having at least one process group;

d. means for taking all of said process groups out of service on said first computer upon a system layer process group fault occurring on said first computer;

e. means for re-booting said first computer upon a system layer process group fault occurring on said first computer;

f. means for providing, on at least a first of said at least two computers, a platform layer having at least one process group;

g. means for taking all of said process groups, except each of said at least one process group in said system layer, out of service on said first computer upon a fault in a resource depended upon by at least one of said platform layer process groups on said first computer;

h. means for providing at least one paired process group on a second of said at least two computers, said at least one paired process group being paired with one of said process groups on said first computer; and i. means for activating said at least one paired process group on said second computer upon said fault in said resource depended upon by at least one of said platform layer process groups on said first computer.

57. The apparatus of claim 56 further comprising, in combination:

a. means for re-initializing said resource having said fault; and b. means for re-initializing all of said process groups, except each of said at least one process group in said system layer, on said first computer upon said fault in said resource depended upon by at least one of said platform layer process groups on said first computer.

58. The apparatus of claim 57 further comprising, in combination: means for re-booting said first computer upon failure of said re-initializations to cure said fault in said resource depended upon by at least one of said platform layer process groups on said first computer.

59. The apparatus of claim 58 further comprising, in combination: means for using an independent computer to power cycle said first computer upon failure of said re-booting of said first computer to cure said fault in said resource depended upon by at least one of said platform layer process groups on said first computer.

60. The apparatus of claim 59 further comprising, in combination: means for using an independent computer to power down said first computer upon failure of said power cycling of said first computer to cure said fault in said resource depended upon by at least one of said platform layer process groups on said first computer.

61. An apparatus for providing high availability applications comprising, in combination:

a. means for running, on at least two computers, one or more process groups, at least one of said process groups containing one or more processes that have a fault recovery strategy common to said at least one of said process groups;

b. means for running, on at least one of said at least two computers, a process group manager that initiates a fault recovery strategy for at least one of said one or more process groups;

c. means for providing, on at least a first of said at least two computers, a system layer having at least one process group;

d. means for taking all of said process groups out of service on said first computer upon a system layer process group fault occurring on said first computer;

e. means for re-booting said first computer upon a system layer process group fault occurring on said first computer;

f. means for providing, on at least a first of said at least two computers, a platform layer having at least one process group;

g. means for restarting at least one of said platform layer process groups upon a platform layer process group fault occurring on said first computer;

h. means for taking all of said process groups, except each of said at least one process group in said system layer, out of service on said first computer upon failure of said re-start to cure said platform layer process group fault;

i. means for providing at least one paired process group on a second of said at least two computers, said at least one paired process group being paired with one of said process groups on said first computer; and j. means for activating said at least one paired process group on said second computer upon failure of said re-start to cure said platform layer process group fault.

62. The apparatus of claim 61 further comprising, in combination: means for re-initializing all of said process groups, except each of said at least one process group in said system layer, on said first computer upon failure of said re-start to cure said platform layer process group fault.

63. The apparatus of claim 62 further comprising, in combination: means for re-booting said first computer upon failure of said re-initialization to cure said platform layer process group fault.

64. The apparatus of claim 63 further comprising, in combination: means for using an independent computer to power cycle said first computer upon failure of said re-booting of said first computer to cure said platform layer process group fault.

65. The apparatus of claim 64 further comprising, in combination: means for using an independent computer to power down said first computer upon failure of said power cycling of said first computer to cure said platform layer process group fault.

66. An apparatus for providing high availability applications comprising, in combination:

a. means for running, on at least two computers, one or more process groups, at least one of said process groups containing one or more processes that have a fault recovery strategy common to said at least one of said process groups;

b. means for running, on at least one of said at least two computers, a process group manager that initiates a fault recovery strategy for at least one of said one or more process groups;

c. means for providing, on at least said first computer, a system layer having at least one process group;

d. means for taking all of said process groups out of service on said first computer upon a system layer process group fault occurring on said first computer;

e. means for re-booting said first computer upon a system layer process group fault occurring on said first computer;

f. means for providing, on at least a first of said at least two computers, an application layer having at least one process group;

g. means for taking said at least one application layer process group out of service on said first computer upon a fault in said at least one application layer process group on said first computer;

h. means for providing at least one paired process group on a second of said at least two computers, said paired process group being paired with one of said at least one application layer process group taken out of service on said first computer;

i. means for activating said paired process group on said second computer upon said fault in said at least one application layer process group on said first computer; and j. means for re-initializing all of said process groups, except each of said at least one process group in said system layer, on said first computer upon not being able to take said application layer process group having said fault out of service on said first computer.

67. The apparatus of claim 66 further comprising, in combination: means for re-booting said first computer upon failure of said re-initialization to cure said application layer process group fault.

68. The apparatus of claim 67 further comprising, in combination: means for using an independent computer to power cycle said first computer upon failure of said re-boot of said first computer to cure said application layer process group fault.

69. The apparatus of claim 68 further comprising, in combination: means for using an independent computer to power down said first computer upon failure of said power cycling of said first computer to cure said application layer process group fault.

70. An apparatus for providing high availability applications comprising, in combination:

a. means for running, on at least two computers, one or more process groups, at least one of said process groups containing one or more processes that have a fault recovery strategy common to said at least one of said process groups;

b. means for running, on at least one of said at least two computers, a process group manager that initiates a fault recovery strategy for at least one of said one or more process groups;

c. means for providing, on at least a first of said at least two computers, an application layer having at least two process groups;

d. means for defining a dependency by at least a first of said at least two application layer process groups upon at least a second of said at least two application layer process groups;

e. means for taking said first and said second application layer process groups out of service on said first computer upon a fault in said second application layer process group on said first computer;

f. means for providing at least one paired process group on a second of said at least two computers, said paired process group being paired with said second application layer process group on said first computer; and g. means for activating said paired process group on said second computer upon said fault in said second application layer process group on said first computer.

71. The apparatus of claim 70 further comprising, in combination:

a. means for providing, on at least said first computer, a system layer having at least one process group;

b. means for taking all of said process groups out of service on said first computer upon a system layer process group fault occurring on said first computer;

c. means for re-booting said first computer upon a system layer process group fault occurring on said first computer; and d. means for re-initializing all of said process groups, except each of said at least one process group in said system layer, on said first computer upon not being able to take said first application layer process group out of service on said first computer.

72. The apparatus of claim 71 further comprising, in combination: means for re-booting said first computer upon failure of said re-initialization to cure said fault in said second application layer process group.

73. The apparatus of claim 72 further comprising, in combination: means for using an independent computer to power cycle said first computer upon failure of said re-boot of said first computer to cure said fault in said second application layer process group.

74. The apparatus of claim 73 further comprising, in combination: means for using an independent computer to power down said first computer upon failure of said power cycling of said first computer to cure said fault in said second application layer process group.

75. An apparatus for providing high availability applications comprising, in combination:
   a. means for running, on at least two computers, one or more process groups, at least one of said process groups containing one or more processes that have a fault recovery strategy common to said at least one of said process groups;
   b. means for running, on at least one of said at least two computers, a process group manager that initiates a fault recovery strategy for at least one of said one or more process groups;
   c. means for providing, on at least a first of said at least two computers, an application layer having at least one process group;
   d. means for taking said at least one application layer process group out of service on said first computer upon a fault in a resource depended upon by said at least one application layer process group;
   e. means for providing at least one paired process group on a second of said at least two computers, said paired process group being paired with one of said at least one application layer process group on said first computer; and
   f. means for activating said paired process group on said second computer upon said fault in said resource depended upon by said at least one application layer process group.

76. The apparatus of claim 75 further comprising, in combination:
   a. means for providing, on at least said first computer, a system layer having at least one process group;
   b. means for taking all of said process groups out of service on said first computer upon a system layer process group fault occurring on said first computer;
   c. means for re-booting said first computer upon a system layer process group fault occurring on said first computer;
   d. means for re-initializing said resource having said fault; and
   e. means for re-initializing all of said process groups, except each of said at least one process group in said system layer, on said first computer upon not being able to take said at least one application layer process group out of service on said first computer.

77. The apparatus of claim 76 further comprising, in combination: means for re-booting said first computer upon failure of said re-initializations to cure said fault in said resource depended upon by said at least one application layer process group.

78. The apparatus of claim 77 further comprising, in combination: means for using an independent computer to power cycle said first computer upon failure of said re-boot of said first computer to cure said fault in said resource depended upon by said at least one application layer process group.

79. The apparatus of claim 78 further comprising, in combination: means for using an independent computer to power down said first computer upon failure of said power cycling of said first computer to cure said fault in said resource depended upon by said at least one application layer process group.

80. An apparatus for providing high availability applications comprising, in combination:
   a. means for running, on at least two computers, one or more process groups, at least one of said process groups containing one or more processes that have a fault recovery strategy common to said at least one of said process groups;
   b. means for running, on at least one of said at least two computers, a process group manager that initiates a fault recovery strategy for at least one of said one or more process groups;
   c. means for providing, on at least said first computer, a system layer having at least one process group;
   d. means for taking all of said process groups out of service on said first computer upon a system layer process group fault occurring on said first computer;
   e. means for re-booting said first computer upon a system layer process group fault occurring on said first computer;
   f. means for providing, on at least a first of said at least two computers, an application layer having at least one process group;
   g. means for re-starting said at least one application layer process group on said first computer upon a fault in said at least one application layer process group;
   h. means for taking said at least one application layer process group out of service on said first computer upon failure of said re-start to cure said fault in said at least one application layer process group;
   i. means for providing at least one paired process group on a second of said at least two computers, said paired process group being paired with one of said at least one application layer process group taken out of service on said first computer;
   j. means for activating said paired process group on said second computer upon failure of said re-start to cure said fault in said at least one application layer process group taken out of service on said first computer; and
   k. means for re-initializing all of said process groups, except each of said at least one process group in said system layer, on said first computer upon not being able to take said application layer process group having said fault out of service on said first computer.

81. The apparatus of claim 80 further comprising, in combination: means for re-booting said first computer upon failure of said re-initialization to cure said application layer process group fault.

82. The apparatus of claim 81 further comprising, in combination: means for using an independent computer to power cycle said first computer upon failure of said re-boot of said first computer to cure said application layer process group fault.

83. The apparatus of claim 82 further comprising, in combination: means for using an independent computer to power down said first computer upon failure of said power cycling of said first computer to cure said application layer process group fault.

84. A method for providing high availability applications comprising, in combination:
   a. means for running, on at least two computers, one or more process groups, at least one of said process groups containing one or more processes that have a fault recovery strategy common to said at least one of said process groups;
   b. means for running, on at least one of said at least two computers, a process group manager that initiates a fault recovery strategy for at least one of said one or more process groups;
   c. means for providing, on at least a first of said at least two computers, an application layer having at least two process groups;
   d. means for defining a dependency by at least a first of said at least two application layer process groups upon at least a second of said at least two application layer process groups;
   e. means for re-starting said second application layer process group on said first computer upon a fault in said second application layer process group;
   f. means for taking said first and said second application layer process groups out of service on said first computer upon failure of said re-start to cure said fault in said second application layer process group;
   g. means for providing at least one paired process group on a second of said at least two computers, said paired process group being paired with said first application layer process group on said first computer; and
   h. means for activating said at least one paired process group on said second computer upon failure of said re-start to cure said fault in said second application layer process group.

85. The apparatus of claim 84 further comprising, in combination:
   a. means for providing, on at least said first computer, a system layer having at least one process group;
   b. means for taking all of said process groups out of service on said first computer upon a system layer process group fault occurring on said first computer;
   c. means for re-booting said first computer upon a system layer process group fault occurring on said first computer; and
   d. means for re-initializing all of said process groups, except each of said at least one process group in said system layer, on said first computer upon not being able to take said first application layer process group out of service on said first computer.

86. The apparatus of claim 85 further comprising, in combination: means for re-booting said first computer upon failure of said re-initialization to cure said fault in said second application layer process group.

87. The apparatus of claim 86 further comprising, in combination: means for using an independent computer to power cycle said first computer upon failure of said re-boot of said first computer to cure said fault in said second application layer process group.

88. The apparatus of claim 87 further comprising, in combination: means for using an independent computer to power down said first computer upon failure of said power cycling of said first computer to cure said fault in said second application layer process group.

* * * * *